[11] 3,597,643

[72] Inventors Marc Bregeault;
Bernard Grancoin, both of Paris, France
[21] Appl. No. 10,398
[22] Filed Feb. 11, 1970
[45] Patented Aug. 3, 1971
[73] Assignee Thomson-CSF
[32] Priority Feb. 17, 1969
[33] France
[31] 6903853

[54] TACHOMETER NEGATIVE FEEDBACK DEVICE FOR A HALL EFFECT DC MOTOR
9 Claims, 7 Drawing Figs.

[52] U.S. Cl. ........................................ 310/10,
310/138
[51] Int. Cl. ............................................ H02k
[50] Field of Search ........................................ 310/10, 40,
152; 318/138, 326, 7

[56] References Cited
UNITED STATES PATENTS

| | | | |
|---|---|---|---|
| 3,210,631 | 10/1965 | Niccolls | 318/138 |
| 3,293,457 | 12/1966 | Mori et al. | 310/10 |
| 3,375,422 | 3/1968 | Boudigues | 318/138 |

*Primary Examiner*—D. X. Sliney
*Attorney*—Kurt Kelman

ABSTRACT: A tachometer negative feedback device, for a Hall effect DC motor having a resolver whose stator carries two Hall generators and whose rotor has $p$ pairs of poles of permanent magnetization, and a motor element, whose stator carries two windings respectively supplied by these Hall generators and whose rotor is similar to that of the resolver and coupled to it. This device comprises two auxiliary coils, respectively associated with the Hall generators and located on the stator of the resolver, at the same predetermined angular distance from their associated Hall generators, to within a multiple of $\pi/p$. Each coil is connected in series with its associated Hall generator.

PATENTED AUG 3 1971 3,597,643

INVENTORS
MARC BREGEAULT
BERNARD GRANCOIN

By [signature]
AGENT

TACHOMETER NEGATIVE FEEDBACK DEVICE FOR A HALL EFFECT DC MOTOR

The present invention relates to a tachometric negative feedback device for Hall effect DC motors, which enables them to readily be used in servo control systems.

In positional servo systems with tachometer negative feedback, conventional motors require a tachogenerator whose overall size is of the same order as that of the motor and which is coupled to the drive shaft. Thus, the size and cost are virtually doubled.

The present invention relates to Hall effect motors comprising a Hall effect resolver supplying voltages which vary sinusoidally as a function of the angular position of the rotor. It is an object of this invention to overcome the above-mentioned drawback through generating tachometric voltages in the resolver itself.

According to the invention, there is provided a tachometer negative feedback device for a Hall effect direct-current motor having a resolver, whose stator carries two Hall generators at an electrical angle of ($\pi/2$) from one another and whose rotor has $p$ pairs of poles with permanent magnetization, and a motor element, whose stator comprises two coils respectively supplied by said Hall generators and whose rotor has $p$ pairs of poles with permanent magnetization and is coupled to said resolver rotor, said device comprising: two further coils respectively associated with said two Hall generators, and so located as to be submitted to the magnetic field of said resolver rotor, said further coils being respectively offset from their associated Hall generators by respective angles, each of which, disregarding multiples of ($\pi/p$), is equal to a common predetermined angular distance; and electric coupling means for connecting each of said further coils in series with its associated Hall generator.

For a better understanding of the invention and to show how the same may be carried into effect, reference will be made to the drawings accompanying the ensuing description and in which:

FIG. 1a illustrates an embodiment of a multipole Hall effect motor incorporating a device according to the invention, in a front view;

FIG. 1b. is a section along line O–X of FIG. 1a;

Figures 1A, 1B:
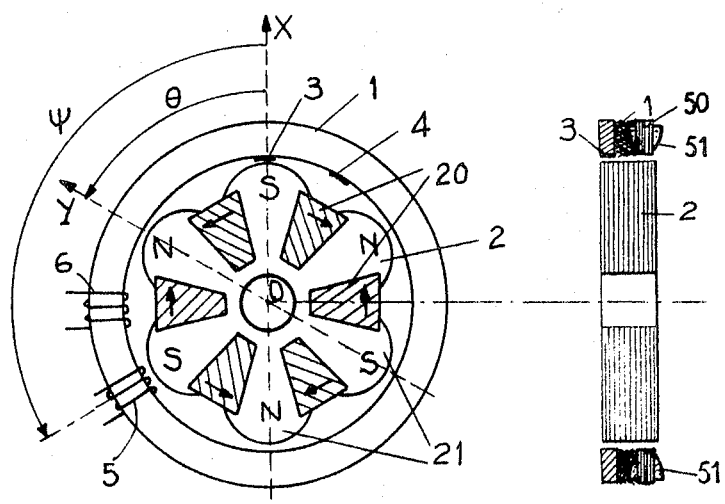
FIGS. 1a and 1b show at (a) a frontal view and at (b) a section of a known multipole Hall effect motor, said motor being equipped with a tachometric negative feedback device in accordance with the present invention.

A motor of this kind comprises a resolver and a motor element which are connected together. The resolver has a stator ring 1 of magnetically soft material, carrying two Hall generators 3 and 4. The radial half-plane forming a part of a symmetry plane of the generator 3 and having OX as its trace on FIG. 1a serves as a reference half-plane.

The Hall generators 3 and 4 are offset from one another by an electrical angular interval of ($\pi/2$), that is to say by a true angular interval of ($\pi/2p$), where $p$ is the number of pairs of poles of the rotor.

The rotor 2 thus has $p$ pairs of poles 21 ($p=3$ here) which are formed by a stack of magnetically soft laminae in which there are embedded permanent magnets 20 whose magnetization is normal to the radial planes of the rotor which are their respective planes of symmetry, this magnetization being alternately in one direction and the other. The rotor thus constituted is common to the resolver and to the motor element. Its angular position is marked by the position of the half-plane of symmetry of an arbitrary reference pole, the trace of this half-plane being OY in the Figure. The stator part of the motor element, solid with the resolver stator, comprises a stack 50 of magnetically soft laminae with slots in which are located two coils, a part of which 51 is shown on FIG. 1(b). Each of the coils is a multipolar winding with $2p$ poles and these coils are shifted one with respect to the other by an electrical angle of ($\pi/2$) (i.e. by an angle of ($\pi/2p$). The tachometer negative feedback device comprises two identical coils 5 and 6 of $n$ turns located around the stator ring 1 and at respective angular intervals of ($2\pi/3$) and ($\pi/6$)+($\pi/3$) from the reference half-plane (line OX) and thus from the Hall generator 3.

The operation is as follows:

The Hall generators 3 and 4 supply voltages proportional to the control current $I_u$ which flows through them and respectively to $\cos 3\theta$ and $\sin 3\theta$, where $\theta$ represents the instantaneous angular position of the rotor 2 (angle between OX and OY). More generally, for a rotor with $p$ pairs of poles, the voltages respectively supplied by the Hall generators 3 and 4 can be written as:

$$V_3 = KI_u B_o \cos p\theta$$
$$V_4 = -KI_u B_o \sin p\theta$$

where K is the Hall coefficient of the assumedly matched Hall generators, and $B_o$ the maximum magnetic field strength in the airgap.

For a coil of $n$ turns surrounding the ring 1 and located at an angular interval $\psi$ from the reference half-plane defined by the line OX, the flux of the airgap is given at any instant by:

$$B = B_o \cos p(\psi - \theta) \quad (1)$$

and the magnetic flux which effectively intersects the coil is given by:

$$\Phi = \Phi_o \sin p(\psi - \theta);$$

if the rotor rotates at an angular velocity $\omega$, then $\theta = \omega t$ if it is assumed that $\theta = 0$ at the time $t = 0$, and the voltage induced in the coil is thus:

$$V = nV_o p\omega \cos p(\psi - \omega t) = nV_o p \psi \cos p(\psi - \theta)$$

This voltage has an amplitude proportional to $\omega$ and can therefore be used as a tachometric alternating voltage. For a coil located at an angular position $$\psi = \frac{k_1 \pi}{p},$$

where $k_1$ is a whole number, the induced voltage is therefore:
$$V_1 = \pm nV_o p\omega \cos p\theta$$
depending upon whether $k_1$ is even or odd.

This is the case with the coil 5, located at ($2\pi/3$) from the OX axis ($k_1$ even) and in which the voltage:
$$V_5 = nV_o p\omega \cos p\theta,$$
is induced.

For a coil located at an angular position $$\psi = \frac{\pi}{2p} + k_2 \frac{\pi}{p}$$

where $k_2$ is a whole number (or, which amounts to the same thing, at the angular interval $(k_2+1)\pi/p$ from the generator 4), the induced voltage is: $V_2 = \pm nV_o p\omega \sin p\theta$
depending upon whether $k_2$ is even or odd.

This is the case with the coil 6, located at ($\pi/6$)+($\pi/3$) from the OX axis ($k_2$ is odd), in which the voltage:
$$V_6 = -nV_o p\omega \sin p\theta$$
is induced.

If the voltages supplied by the coils 5 and 6 are respectively placed in opposition with the voltages produced by the Hall electrodes 30, 31 of the generator 3, and 40, 41 of the generator 4 (FIG. 3), then the voltages supplied to the motor windings 12 and 13 across the amplifiers 10 and 11, will respectively be:
$$V_{12} = V_3 - V_5 = \cos p\theta (KI_u B_o - nV_o p\omega)$$
and
$$V_{13} = V_4 - V_6 = -\sin p\theta (KI_u B_o - nV_o p\omega).$$

Thus, there are supplied to the two motor windings, which are offset from one another by an electrical angle of ($\pi/2$), two voltages of equal amplitude but in phase quadrature, which are proportional to the Hall voltages $V_3$ and $V_4$, and this means that although a constant motor torque will be produced, its magnitude will have been reduced by a value proportional to the angular velocity of the motor. Thus, tachometric negative feedback has been obtained without having to resort to a supplementary machine, simply by using the voltages induced in coils located in the resolver itself.

However, since these voltages are alternating voltages, they are not used in the same way as a tachometric voltage in a conventional servo system, wherein the tachometric voltage is subtracted from the error voltage controlling the motor. In fact, in the present case, the obtained voltages are no longer subtracted from the motor controlling signal $I_u$ but directly from the Hall voltages themselves. This remains true whatever the direction of rotation of the motor. In other words, if the direction of rotation is reversed, for example by reversing the direction of the control current $I_u$ for the Hall generators, which current is supplied by the source 9 (FIG. 3), $I_u$ and $\omega$ both change sign and correct negative feedback is obtained at all times.

In the example described hereinbefore, coils 5 and 6 located at the same respective angle of $(2k\pi/p)$ from the Hall generators 3 and 4, have been discussed.

However, it is obvious that each coil could be located at an angle of $$\frac{(2k+1)\pi}{p}$$

from the associated Hall generator. In this case, the voltages induced in the coils 5 and 6 will no longer be opposed to but, instead, added to the Hall voltages.

Self-evidently, it is within the scope of any person skilled in the art to arrive at hybrid solutions for the positioning of the coils, but this in no way departs from the principle of the invention. The principle applies equally of course in the case of the two-pole Hall effect motor described in U.S. Pat. No. 3,375,422.

Figure 2:
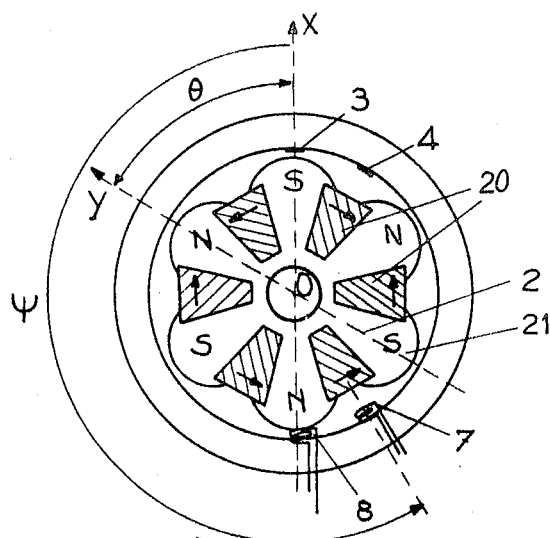
FIG. 2 illustrates a variant embodiment of the device in accordance with the invention.

FIG. 2 illustrates a variant method of connecting the negative feedback coils. The $n$-turn coils 7 and 8 are located in the airgap itself, the plane of turns being perpendicular to the radius of the resolver passing through the center of the coil and at respective angular distances of $(\pi/6)+(3\pi/3)$ and $(3\pi/3)$ from the reference half-plane marked by the line OX, and thus from the Hall generator 3.

In this case, the field in the airgap at a point at the angular distance $\omega$ being defined in all cases by the equation (1), the flux intersecting the coil located at this point is given by $\Phi' = \Phi'_0 \cos p(\omega - \theta)$ and the voltage induced for an angular velocity $\omega$ of the rotor, by:

$V' = -nV'_0 p\omega \sin p(\psi - \theta)$

For a coil located at an angular position $$\psi = \frac{\pi}{2p} + \frac{k'_1 \pi}{p}$$

where $k'_1$ is a whole number, the voltage induced is given by:

$V'_1 = \pm nV'_0 p\omega \cos p\theta$ depending upon whether $k'_1$ is odd or even.

This is the case with the coil 7, located at $(\pi/6)+(3\pi/3)$ ($k'_1$ is odd), in which the voltage:

$V_7 = nV'_0 p\omega \cos p\theta$ is induced.

For a coil located at an angular position $\psi = k'_2 (\pi/p)$ (or, and this is tantamount to the same thing, at the interval $$\frac{\pi}{2p} + k'_2 \frac{\pi}{p}$$

from the generator 4), we have:

$V'_2 = \pm nV'_0 p\omega \sin p\theta$ depending upon whether $k'_2$ is even or odd.

This is the case for the coil 8, located at $3_3$ ($k'_2$ is odd) and in which the voltage:

$V_8 = -nV'_0 p\omega \sin p\theta$ is induced.

Here, too, voltages $V_7$ and $V_8$ having an amplitude proportional to $\omega$ are available, and these can be placed in opposition respectively with the Hall voltages $V_3$ and $V_4$ in order to obtain tachometer negative feedback. This is valid in a general way for the airgap coils which are located respectively at the angle $$\frac{\pi}{2p} + \frac{(2k'+1)\pi}{p}$$

from the Hall generators 3 and 4.

As before, it is also possible to use two coils at an angular interval $$\frac{\pi}{2p} + \frac{2k'\pi}{p}$$

from the Hall generators, or, for that matter, to employ some kind of hybrid solution.

Figure 3:
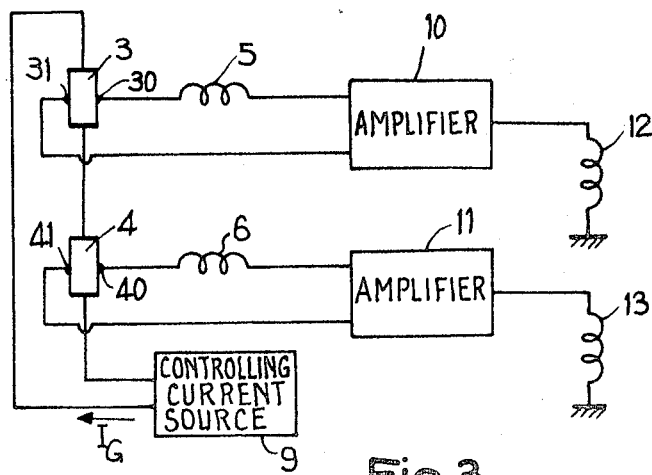
FIG. 3 illustrates an electrical circuit diagram of the Hall effect motor incorporating a device in accordance with the invention.

However, the tachometer negative feedback voltages used in the manner indicated in FIG. 3, cannot be adjusted. In this figure, elements 10 and 11 are the amplifiers which supply respectively the motor coils 12 and 13.

Figure 4:
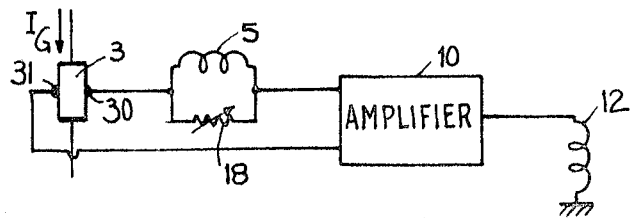
FIGS. 4a, 4b and 4c illustrate several variant circuit diagrams.
Figure 4:
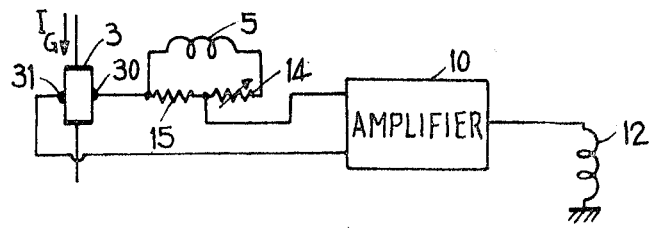
Figure 4:
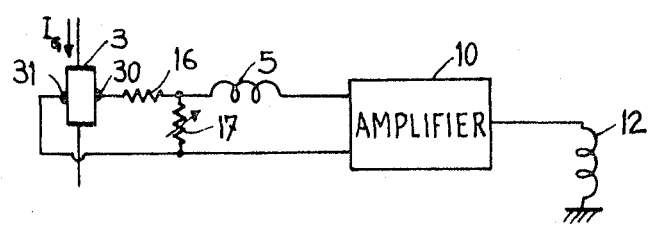

FIGS 4a—c illustrate three examples of circuits in which the tachometer negative feedback can be adjusted. The two channels being identical, only one has been shown, in order to avoid overburdening the drawing. In FIG. 4a the coil 5 is connected in parallel with a variable resistor 18.

In FIG. 4b, a potentiometer circuit made up of the resistor 15 and the variable resistor 14, is placed in parallel across the coil. Finally, FIG. 4c shows the potentiometer circuit comprising the resistor 16 and the variable resistor 17, placed in parallel with the Hall generator.

Self-evidently, the embodiments described are in no way limitative of the scope of the invention.

What we claim is:

1. In a Hall effect direct current motor comprising a stator having two coils, and a rotor having pairs of permanently magnetized poles: a resolver mechanically coupled to said motor, two Hall generators located in the resolver and supplying respective ones of two coils, said resolver comprising a stator mounting said two Hall generators at an electrical angle of $(\pi/2)$ from one another, and a rotor having $p$ pairs of permanently polarized poles; a tachometer negative feedback device comprising two feedback voltage sources generating a voltage proportional to the speed of rotation, said voltage sources being constituted by two fixed coils located along said resolver stator and cut by the magnetic field of said resolver rotor; and electric coupling means for connecting respectively each of said feedback coils in series with each of said Hall generators, in the opposition connection mode, the respective angular distance between each of the two coils and their connected generators being equal to a common predetermined angular distance.

2. A device as claimed in claim 1, wherein said feedback coils are located in the airgap of said resolver, the plane of each of said coils being perpendicular to the radius of said resolver passing through the center of said coil, and said predetermined angular distance is substantially equal to $(\pi/2p)$.

3. A device as claimed in claim 1, wherein said resolver stator comprises a magnetic flux collecting ring of magnetically soft material, said feedback coils are wound round said ring and said predetermined angular distance is substantially equal to zero, said respective angles being multiples of $(\pi/p)$ other than zero.

4. A device as claimed in claim 2, wherein said coupling means comprise two variable resistors connected in parallel respectively with said feedback coils.

5. A device as claimed in claim 3, wherein said coupling means comprise two variable resistors connected in parallel respectively with said feedback coils.

6. A device as claimed in claim 2, wherein said coupling means comprise, for each of said feedback coils, a resistor and a variable resistor in series, connected in parallel with said coil, and said associated Hall generator is connected between one terminal of said coil and the junction point of said resistors.

7. A device as claimed in claim 3, wherein said coupling means comprise, for each of said feedback coils, a resistor and a variable resistor in series, connected in parallel with said coil, and said associated Hall generator is connected between one terminal of said coil and the junction point of said resistors.

8. A device as claimed in claim 2, wherein said coupling means comprise, for each of said feedback coils, a resistor and a variable resistor in series, connected in parallel with said associated Hall generator, and said coil is connected to the junction point of said resistors.

9. A device as claimed in claim 3, wherein said coupling means comprise, for each of said feedback coils, a resistor and a variable resistor in series, connected in parallel with said associated Hall generator, and said coil is connected to the junction point of said resistors.